Sept. 9, 1952 D. E. WIEGAND 2,610,230
INTEGRATOR AND HYSTERESIS LOOP TRACER
Filed Feb. 20, 1947 4 Sheets-Sheet 1
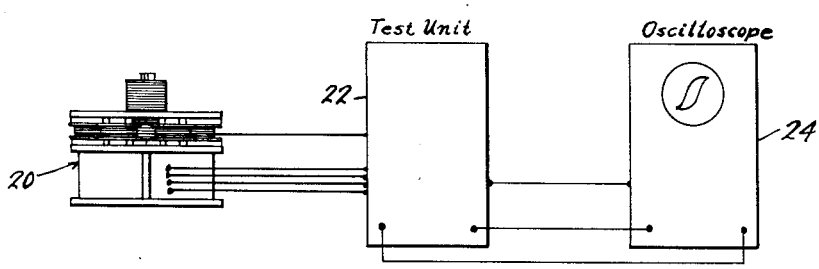
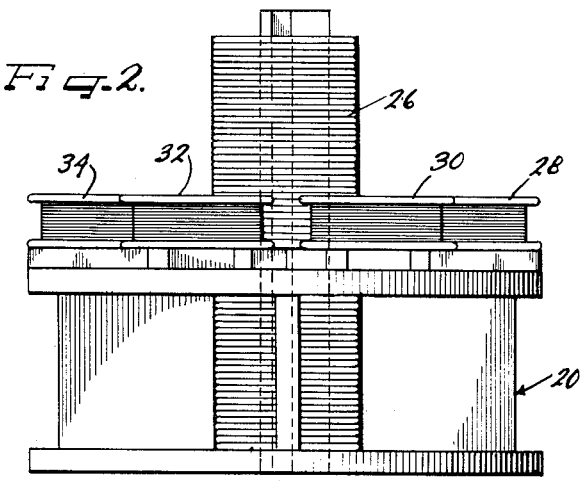
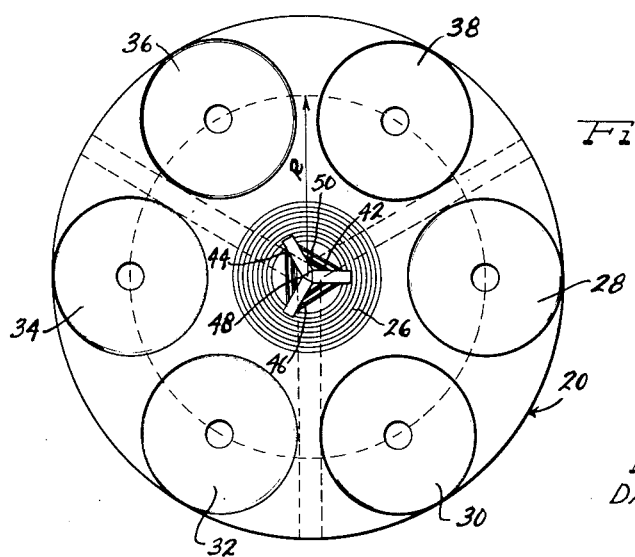
Inventor
DAVID E. WIEGAND Sept. 9, 1952  D. E. WIEGAND  2,610,230
INTEGRATOR AND HYSTERESIS LOOP TRACER
Filed Feb. 20, 1947  4 Sheets-Sheet 2

Inventor
DAVID E. WIEGAND
by
Attys.

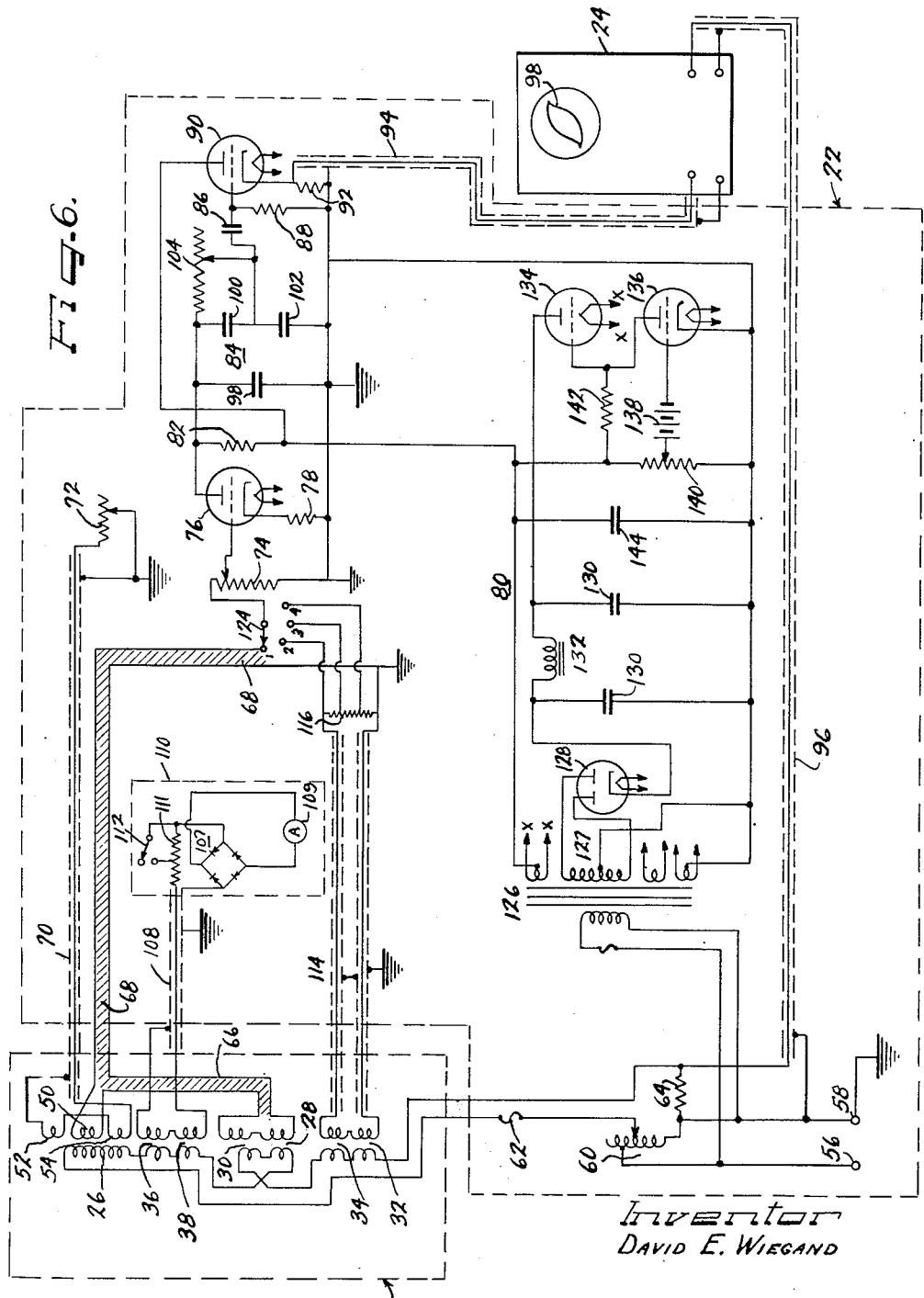

Sept. 9, 1952          D. E. WIEGAND          2,610,230

INTEGRATOR AND HYSTERESIS LOOP TRACER

Filed Feb. 20, 1947          4 Sheets—Sheet 4

Inventor
David E. Wiegand
by The Firm of Charles W. Hills
Attys.

Patented Sept. 9, 1952

2,610,230

UNITED STATES PATENT OFFICE 2,610,230

INTEGRATOR AND HYSTERESIS
LOOP TRACER

David E. Wiegand, Villa Park, Ill., assignor to Armour Research Foundation of Illinois Institute of Technology, Chicago, Ill., a corporation of Illinois Application February 20, 1947, Serial No. 729,693

6 Claims. (Cl. 175—183)

1

My invention relates to testing devices for the determination of B-H curves of a magnetic medium.

The performance of a magnetic medium depends to a large degree on the B-H curve of the medium under the operating conditions encountered in the apparatus in which it is used. In the case of magnetic recorders and like equipment involving small quantities of medium, these characteristics, if available at all, have been determined only at the price of using large, slow, expensive apparatus that is difficult to operate and requires expert control, particularly if measurements are desired at high values of magnetomotive force or "H." Furthermore, small errors in positioning of the samples in such equipment have been the source of substantial errors in measurement. Moreover, measurements of small samples have heretofore required the use of standardizing or calibrating samples to fix the instrument scales relative to the desired units of flux density (B) and magnetomotive force (H). Such standardizing samples always introduce the possibility of error because of the unpredictable changes in magnetic characteristics thereof with time and use. In accordance with the present invention, these difficulties are eliminated so that measurements of small samples of magnetic material, such as the fine wire or tape used for magnetic recording, may be made quickly and accurately even at high magnetomotive force values without reference to calibrating samples or the use of delicate equipment.

It is accordingly a general object of my invention to provide an improved B-H curve tracer capable of accurately and quickly determining the B-H curve of a small sample of magnetic medium at high magnetomotive force values and without use of reference or calibrating samples.

It is an object of my invention to provide an improved B-H curve tracer, having a built-in calibration system based on fundamental electrical and magnetic quantities so as to avoid need for a standard or reference sample.

Further, it is an object of my invention to provide an improved B-H curve tracer wherein the sample may be readily positioned for testing, and errors in positioning the samples do not cause errors in measurement.

It is yet another object of my invention to provide an improved B-H curve tracer capable of subjecting a small sample of magnetic media to large values of magneto-motive force.

It is still another object of my invention to provide an improved B-H curve tracer suitable

2 for use at a relatively low frequency, such as 60 cycles, so as to eliminate difficulties due to stray magnetic and electric fields together with the phase shift and power losses associated with high frequency currents and facilitate obtaining the power necessary to operate the equipment.

Still another object of my invention is to provide an improved integrating network to generate a voltage determined by the integral of another voltage, and which has features of high output voltage and low phase shift while at the same time involving a simple circuit.

Yet another object of my invention is to provide an improved device to indicate the instantaneous value of alternating current flow in an electrical circuit.

The novel feature which I believe to be characteristic of my invention are set forth with particularity in the appended claims. My invention itself, however, both as to its organization and method of operation, together with further objects and advantages thereof, may best be understood by reference to the following description taken in connection with the accompanying drawings.

On the drawings:

Figure 1 is a somewhat diagrammatic view showing a solenoid structure, test unit, and oscilloscope and the connections therebetween for tracing B-H curves in accord with my invention;

Figures 2 and 3 are side elevational and top plan views respectively of the solenoid structures used in the system of Figure 1;

Figure 6 is a schematic circuit diagram of the B-H curve tracer;

As shown on the drawings:

Figure 4:
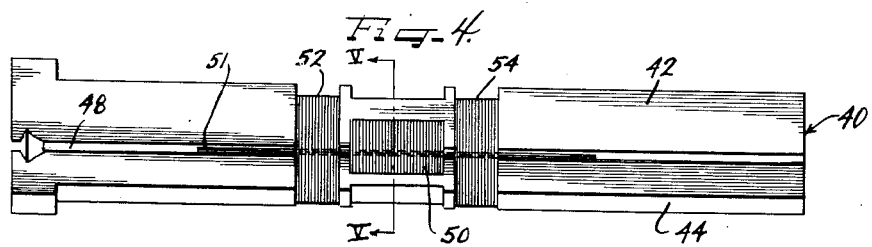
Figures 4 and 5 are enlarged side elevational and top plan views respectively of the sample holder portion of the solenoid structure of Figures 1, 2, and 3.

The principal component elements of the B-H curve tracing mechanism of this invention are shown in Figure 1. It is the purpose of the solenoid structure 20 to hold the sample under test and to subject that sample to the desired magnetomotive force. Exciting current for this structure is derived from test unit 22 which is also receiving output voltage from the various coils of solenoid system 20 to produce a voltage determined by the magnetic flux density in the sample. This voltage is applied to a cathode ray oscilloscope 24 to deflect the ray beam thereof in the vertical direction in accord with the flux density in the sample. Test unit 22 also supplies the oscilloscope 24 with a voltage determined by the magnetic field strength to which the sample is subjected, which voltage controls the horizontal deflection of the ray beam thereof. Inasmuch as the vertical deflection of the ray beam of oscilloscope 24 corresponds to the magnetic flux density (B) within the sample and the horizontal deflection is determined by the magnetic field intensity (H) of the sample, a trace appears upon the screen of oscilloscope 24 as these values are varied with time. The shape of this trace corresponds with the B-H characteristics of the sample.

The solenoid structure 20 supports the sample under test, subjects that sample to predetermined magnetomotive force, and provides means to pick up voltages proportional to the flux density within the sample. Furthermore, solenoid structure 20 provides means to calibrate the system so that the values corresponding to predetermined deflections of the ray beam of oscilloscope 24 may be determined. As shown in Figures 2 and 3, the solenoid structure 20 comprises an inner or exciting solenoid 26 about which are mounted a plurality of outer mutual inductors 28, 30, 32, 34, 36 and 38. As will be evident from examination of Figure 3, the mutual inductors are mounted at equal angular increments about a common radius R from the center of the exciting solenoid 26, so that current flow in the solenoid 26 produces a common value of total magnetic flux through each of the mutual inductors. As will be described in detail hereafter, a pickup coil 50 is mounted within solenoid 26 to produce an electromotive force proportional to the time rate of change of flux therein. The sample to be tested, 51, is disposed within tube 48 which is positioned by supports 42, 44 and 46 so as to be within both the pickup coil 50 and the solenoid 26.

Each of the six mutual inductors 28, 30, 32, 34, 36 and 38 consists of a primary winding and a secondary winding mounted in coaxial relation so as to provide mutual inductance between the two windings. These are connected in three groups of adjacent coil pairs. One group, coils 28 and 30 constitutes the balancing mutual inductors to eliminate the effect of flux in the pickup coil 50 associated with the air flux in solenoid 26 existing in the absence of a sample. The second set, coils 32 and 34, are calibrating mutual inductors, to calibrate the B or flux density scale of the viewing screen of oscilloscope 24. The third set of mutual inductors, coils 36 and 38, are the H or magnetic field measuring mutual inductors to measure the magnetic field intensity to which the sample is subjected and calibrate the corresponding scale of the viewing screen of oscilloscope 24.

Fine adjustment in the mutual inductance between the adjacent pairs of each group of mutual inductors is achieved by altering the angular spacing between the two coils without altering their radial distance R. The windings of each pair of mutual inductors are electrically connected so that the vertical field components associated with the two coils are opposite in direction so that when current flows therethrough no magnetic field is produced in the center of the exciting solenoid 26 and no voltage is picked up in coil 50. Moreover, since the mutual inductors are mounted at equal radius about exciting solenoid 26 and their axes are parallel to the axis of that solenoid, current flow in solenoid 26 produces no voltage in any pair of mutual inductors since the voltage induced in one coil of each pair is equal and opposite the voltage induced in the other coil.

Figures 5, 7:
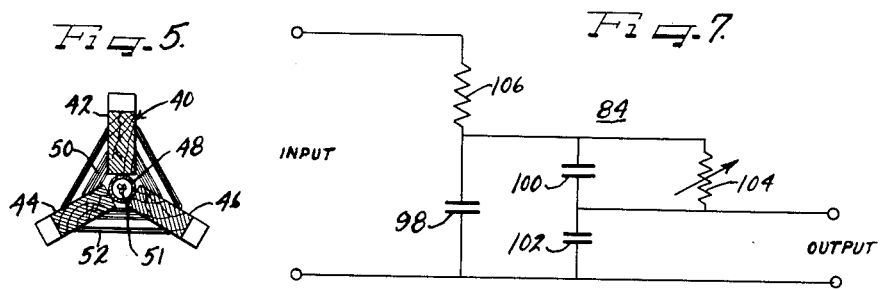
Figure 7 is a more detailed circuit diagram showing the improved integrator circuit of this invention and the impedance elements affecting the operation thereof.

It is the purpose of the pickup coil 50, shown most clearly in Figures 4 and 5, to generate a voltage determined by the time rate of flux change within the sample under test. In the views of Figures 4 and 5, the sample holder, indicated generally at 40, is shown without the exciting coil 26. As will be evident from these views, sample holder 40 consists of three supports 42, 44 and 46 surrounding at equal angles to the sample holding tube 48. In addition to positioning exciting coil 26, the supports 42, 44 and 46 sustain the pickup coil 50 in position on the axis of the exciting coil 26 and at the center thereof. Mutual resistance coils 52 and 54 are also mounted on supports 42, 44 and 46.

In the illustrative construction of the sample holder of Figures 4 and 5, the tube 48 is a Pyrex guide tube and supports 42, 44 and 46 are of wood. It will be apparent to those skilled in the art, however, that any non-magnetic materials having suitable mechanical characteristics may be used for this purpose. The diameter of tube 48 is chosen so as to enable insertion of a group of magnetizable wires or paper tapes of the type used in magnetic recording and reproducing devices.

Figure 8:
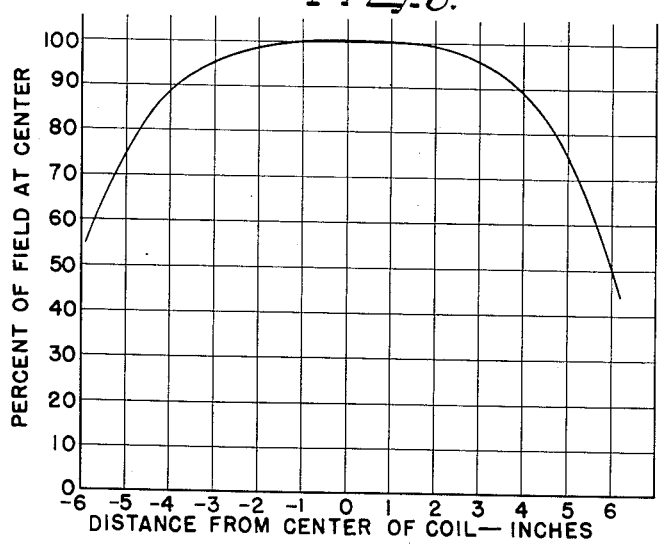
Figure 8 shows the variations in field strength along the length or axis of the exciting solenoid used to establish a magnetic field within the sample of magnetic medium.

In the enlarged view of Figures 4 and 5 the samples to be tested, 51, are shown in position within tube 48. These samples are preferably of a length at least half the length of solenoid 26 and are centrally disposed along the axis of solenoid 26. The variation in magnetic field intensity along the axis of coil 26 as a function of the distance from the center thereof is shown in Figure 8. This figure shows clearly that the sample is subjected to a substantially constant field intensity in the region of the pickup coil and the induced voltage within that coil due to the presence of the sample corresponds to a uniform degree of magnetization therein.

The operating features of this invention may best be understood by the consideration of the schematic circuit diagram of Figure 6, together with the physical structures above described with reference to Figures 1 to 5. In Figure 6, the various mutual inductors, exciting solenoids, and the like are shown diagrammatically and identified with numerals corresponding to numerals utilized in the above description with reference to the actual physical structure of the coils. In addition the diagram is divided by dotted lines into units constituting the component portions of the complete system of Figure 1 and corresponding to numerals of identification applied thereto.

Energizing current flow for exciting solenoid 26 is derived from a source of alternating voltage connected to terminals 56 and 58. This current flows through adjustable auto transformer 60, fuse 62, solenoid 26, the primary windings of mutual inductors 36, 38, 30, 28, 34 and 32, and back to terminal 58 through series resistance 64. When the current flows through energizing solenoid 26, voltage is induced in pickup coil 50, this voltage being determined by the time rate of change of magnetic flux within coil 26. Likewise, exciting current flow through the primary windings of mutual inductors 28 and 30 causes voltage to be induced in the secondary windings thereof determined by the time rate of change of current flow in the two separate mutual inductors, thereby producing a voltage proportional to the induced voltage in pickup coil 50 when a sample is not contained in the unit.

The secondary windings of mutual inductors 28 and 30 are connected in series so that the total induced voltage therein is the sum of the two separate induced voltages together with the mutually induced voltages therebetween. These inductors are connected in series opposition with pickup coil 50 by low capacity transmission line 68. Since the induced voltage in the mutual inductors 28 and 30 is proportional to the induced voltage in pickup coil 50 when no sample is contained in the unuit, it is only necessary properly to proportion mutual inductors 28 and 30 relative to pickup coil 50 to reduce to zero the effective voltage applied to transmission line 68 when there is no sample in the unit. Final changes in this adjustment may be made by adjusting the spacing between the mutual inductors 28 and 30 so as to vary the total mutual inductance therebetween.

While the mutual inductors 28 and 30 provide nearly complete balancing of the induced voltage in coil 50 when no sample is located in solenoid 26, there is a slight voltage that cannot be eliminated. This voltage results from eddy currents in the winding conductors, clamping bolts, and other conductors located in the fields of these coils and is in phase with the current flow in exciting coil 26. Adjustments of the mutual inductance between mutual inductors 28 and 30 is ineffective to equalize these in-phase voltage components.

It is the function of mutual resistance coils 52 and 54 to compensate for the in-phase components of voltage applied to transmission line 68 because of the unequal in-phase voltages in pickup coil 50 and mutual inductors 28 and 30. These coils are wound in a common direction at each end of pickup coil 50, as will be evident from Figure 4, and are connected by transmission line 70 to variable resistance 72. As the value of variable resistance 72 is relatively great compared with the inductive reactance of coils 52 and 54, the current flow therein is substantially in-phase with the induced voltage. Thus mutual resistance coils 52 and 54 alter the induced voltage in coil 50 in a manner similar to bolts and other conducting objects in the field thereof. By appropriately adjusting resistance 72 the influence of the mutual resistance coils 52 and 54 on the voltage in pickup coil 50 may be equalized with the effect of the clamping bolts and other conductors in mutual inductors 28 and 30, thereby reducing to zero the voltage applied to transmission line 68 in the absence of a sample.

It is the purpose of electron discharge device 76 to amplify the voltage of transmission line 68. To this end, potentiometer 74 is connected to the end of that line opposite coil 50 and the moving arm connected to the control electrode of electron discharge device 76. Resistance 78 is connected in the cathode circuit of device 76 to provide a degree of inverse feedback so as to improve the stability and fidelity of amplification. Unidirectional cathode-anode space path voltage for device 76 is derived from the power supply indicated generally at 80 through resistance 82, across which is developed a voltage varying in accord with the space current flow in device 76.

It is the purpose of the integrator indicated generally at 84 to produce a voltage proportional to the integrated value of the voltage wave appearing across resistance 82. This integrator includes capacitor 96 connected from the anode of device 76 to ground, together with capacitors 100 and 102 connected in series between the anode of device 76 and ground and variable resistance 104 shunting capacitor 100. The operation of this circuit is described in further detail hereafter.

Electron discharge device 90 acts as a cathode follower type amplifier, deriving cathode-anode space path voltage from the unidirectional voltage source indicated generally at 80, through cathode resistance 92. Voltage developed across this resistance is applied through transmission line 94 to oscilloscope 24. Capacitance 86 and resistance 88 act as grid capacitor and grid leak respectively for device 90. As is well known in the art, the cathode follower type amplifier including electron discharge device 90, has an extremely high input impedance so that it has slight effect on the operation of the integrator circuit indicated generally at 84. Furthermore, the output impedance of cathode follower amplifier including electron discharge device 90 is relatively low and may be used to feed a low impedance input circuit in oscilloscope 24.

From the above description it is evident that electron discharge device 76 amplifies the induced voltage in pickup coil associated with the presence of the sample within the exciting coil 26, and produces a voltage across resistance 82 having wave shape corresponding to that induced voltage. This wave is integrated in integrator 84, and applied to cathode follower electron discharge device 90 to supply to oscilloscope 24 a voltage determined by the integral of the induced voltage in coil 50. Since the induced voltage in coil 50 that is not balanced by coils 28 and 30 is determined by the time rate of change of the magnetic flux within coil 50 due to the sample, and integrator 84 converts this time varying voltage to a voltage having value determined by the integral of the time varying voltage, the output voltage from integrator 84 is proportional to the magnetic flux intensity within the sample and the ray beam of oscilloscope 24 is deflected in accord with the magnetic flux in the sample.

Oscilloscope 24 may be any one of many types well known in the art. In general, it will include a cathode ray device with electric or magnetic ray deflecting elements, together with the amplifiers and other equipment necessary to convert small applied voltages to values sufficient to provide an appropriate degree of beam deflection. In the equipment described herein, for example, the elements of oscilloscope 24 connected to the end of transmission line 94 might include, for example, a series of amplifiers to increase the voltage therein to a value sufficient to provide the desired degree of deflection of the cathode ray beam. The output voltage of these amplifiers, for example, might be connected to the vertical deflecting plates of the cathode ray device so as to cause the ray beam thereof to assume a vertical position corresponding to the intensity of the applied voltage and hence the intensity of the magnetic flux within the sample.

Simultaneously with the application of voltage proportional to the magnetic flux within the sample to the vertical deflecting plates of oscilloscope 24, a voltage corresponding to the current flow in coil 26 is applied to oscilloscope 24 by reason of a transmission line 96, which has one end connected across resistance 64 and the other end connected to oscilloscope 24. In one form of oscilloscope 24, for example, the voltage of transmission line 96 is amplified to increase the value thereof to an amount sufficient for application to the horizontal ray deflecting plates of the cathode ray device. This voltage is applied to these plates so that the horizontal position of the ray beam is determined by the instantaneous value of the voltage across resistance 64 and hence the current flow in exciting coil 26.

Since the horizontal position of the cathode ray beam is determined by the current flow in coil 26, and hence the magnetic field intensity, H, to which the sample is subjected, and the vertical position of the cathode ray beam is determined by the magnetic flux within the sample, and hence the magnetic flux density, B, of the sample, a curve is traced on the viewing screen of the cathode ray device corresponding to the B-H curve of the magnetic sample, this curve having, for example, the shape shown at 98, Figure 6.

The performance of the integrator shown generally at 84, Figure 6, can best be understood by reference to Figure 7 which shows an enlarged circuit diagram, together with a series resistance 106 representing the output impedance of the amplifier stage comprising electron discharge device 76.

One measure of performance of the improved integrating network of this invention in producing a voltage across the output terminals proportional to the integral of the voltage across the input terminals is the phase error in the output voltage relative to an output voltage comprising a true integration of the input voltage and the attenuation of the output voltage relative to that voltage corresponding to true integration of the input voltage. If there is no phase error or variation in attenuation over a frequency range sufficiently wide to include all the significant components of the input voltage, the wave shape of the output voltage corresponds identically with the wave shape of a true integral of the input voltage. Any deviation from this true integral is determined by magnitude of the phase error, or the variations in attenuation.

Figure 9:
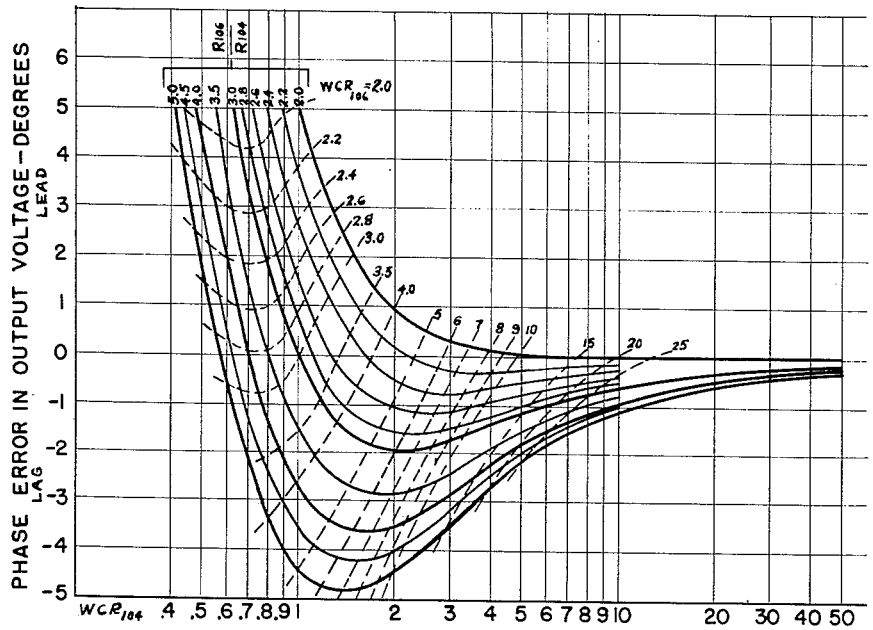
Figures 9 and 10 are curves showing the performance of my improved integrator.

It can be shown that the angle of phase shift, $\theta$, with the integrating network of Figure 7 is determined by the following formula:

$$\theta = \tan^{-1} \left[ \frac{1 + \frac{(wCR_{104})^2}{1+(wCR_{104})^2}\left(1 - \frac{R_{106}}{R_{104}}\right)}{\left[wCR_{104}\frac{1+(wCR_{104})^2\frac{R_{106}}{R_{104}}}{1+(w^2C^2R_{104}^2)} + 2\frac{R_{106}}{R_{104}}\right]} \right]$$

where:

$w$ is the frequency in radians per second
C is the common value of capacitors 98, 100, and 102 in farads
$R_{104}$ is the resistance of resistance 104 in ohms
$R_{106}$ is the resistance of resistance 106 in ohms The value of this phase error or phase shift over a relatively large range of frequencies and typical values of the circuit components and equal values of capacitors 98, 100 and 102 is shown in Figure 9, the phase errors being shown in degrees lag and lead over the voltage that would be produced at the output terminals in the event of true integrator action.

In the application of the integrator circuit of Figure 7 to the B-H curve tracer, it is desirable to reduce the phase error to zero at the frequency of the source voltage applied to terminals 56 and 58, Figure 6, since this is the principal component of the output voltage. Thus, in one embodiment of my invention $wCR_{104}$ is 2.04 at the 60 cycle frequency applied to terminals 56 and 58, Figure 6, and $$\frac{R_{106}}{R_{104}}$$

is 2.23. From Figure 9 it will be evident that this combination provides zero phase shift at the 60 cycle frequency. Moreover, since it is relatively easy to provide a sinusoidal voltage across terminals 56 and 58, Figure 6, the third harmonic of this voltage is the principal harmonic in the voltage applied to the integrating network. Reference to Figure 9 will show at this point $wCR_{104}$ is 6.12, and phase error of about $-0.28°$ takes place, an error causing insignificant error in the B-H curve values.

A further criterion of the performance of the integrating network is the relation of the magnitude of actual output voltage with the voltage corresponding to true integration. A measure of this ratio, expressed in terms of decibels attenuation, is:

(2)

$$\text{db attenuation} - 20 \log_{10} wCR_{104} = $$
$$20 \log 10 \frac{1+(wCR_{104})^2\frac{R_{106}}{R_{104}}}{1+(wCR_{104})^2} + 2\frac{R_{106}}{R_{104}}$$

where $w$, C, $R_{104}$, and $R_{106}$ have the same significance as in Equation 1.

If this quantity is a constant value over the range of frequencies encountered, the frequency components of the actual integrated wave will have the same relative magnitudes as in a perfectly integrated wave.

Figure 10:
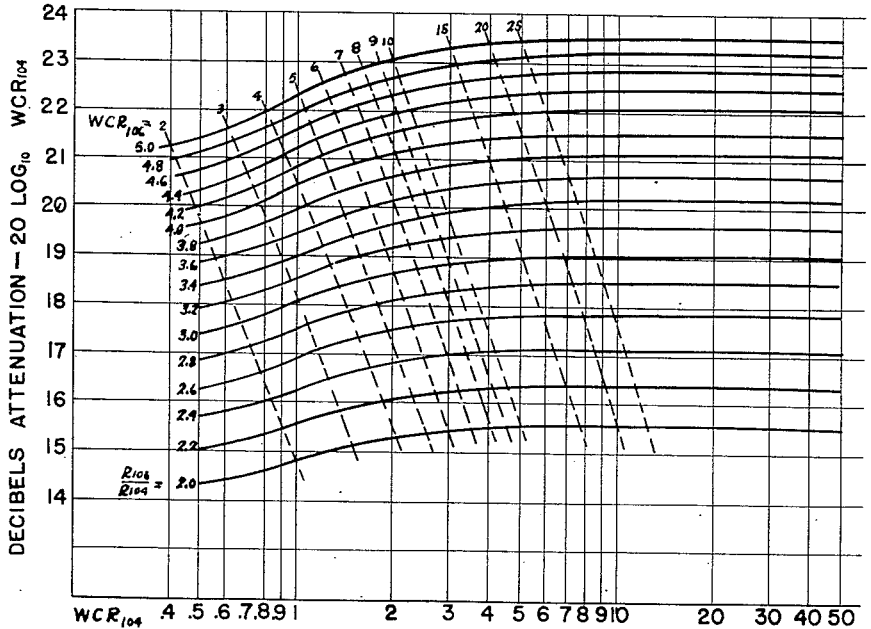

A curve showing the various values of attenuation derived from Equation 2 for different values of circuit parameters for the particular case wherein capacitors 98, 100, and 102 are of equal value is shown in Figure 10. For the above described particular case where $wCR_{104}$ is 2.04 and $$\frac{R_{106}}{R_{104}}$$

is 2.23, it will be observed that the third and higher harmonics are attenuated approximately 0.3 decibel or 3.5% more than they should be. Actual errors in the deflection are smaller than this percentage since the fundamental is the strongest frequency component present, and since the harmonics tend to oppose each other in creating error.

As compared with a conventional integrating network comprising a series resistance and capacitor combination, the improved integrator of this invention is very effective. If, for example, a conventional resistance-capacitor integrating network is designated to have one-half degree phase error at the lowest or fundamental frequency of operation, the output voltage is less than one per cent of the input voltage at that frequency. With the integrator of this invention, designed to produce zero phase error at the fundamental frequency of operation and 0.3 degree phase error at the third harmonic, the fundamental frequency output voltage is six per cent of the fundamental frequency input voltage. Moreover, with the conventional integrating network the greatest phase error is at the fundamental frequency where it has maximum tendency to distort the results whereas in the improved integrator the phase error can be made zero at this frequency.

It will be apparent to those skilled in the art that my improved integrating network differs from the conventional RC integrator in providing impedances further to modify the imperfectly integrated voltage appearing across the capacitor of the RC network. In the particular arrangement of elements I have described in detail these elements include capacitors 100 and 102, each having value equal capacitor 98. It is not essential, however, that this equality of capacitance exist inasmuch as satisfactory operation can be achieved with other proportions of the circuit components.

It is the function of the mutual inductors 36 and 38, Figure 6, together with meter 110, to indicate the peak magnetic field intensity to which the sample is subjected. To this end, the secondary windings of inductors 36 and 38 are connected in series and their free terminals connected to the coaxial transmission line 108. Meter 110 is connected to the opposite end of transmission line 108. This meter includes bridge rectifier 107 with D'Arsonval ammeter 109 connected to the D.-C. side. Multiplier 111 is selectively placed in series with rectifier 107 by switch 112 so as to permit accurate reading over a large range of current values. A voltage is induced in the secondaries of inductors 36 and 38 in proportion to the time rate of current change in exciting solenoid 26. It can be shown that if the periodic current flow in the primary windings of mutual inductors 36 and 38 has equal positive and negative peak values, positive slope between the negative peaks and the positive peaks and negative slope between the positive peaks and the negative peaks, the average value of rectified voltage, and hence the reading of the meter 110 is proportional to the peak current value. As the current flow in the primary windings of mutual inductors 36 and 38 fulfills these conditions, the deflection of meter 110 is proportional to the peak value of current flow in exciting solenoid 26.

From the foregoing description it will be evident that the ammeter 110 provides a direct reading of the peak current flow in exciting solenoid 26 and hence the peak value of the magnetic field to which the sample is subjected. This measurement is accurate even though current flow in solenoid 26 deviates from a sine wave shape since presence of limited harmonics in the wave do not alter the accuracy of the instrument.

It can be shown that for a long thin solenoid, such as exciting coil 26, the field strength at the center thereof is given by the following relationship:

$$(3) \qquad H = k\, 0.4\, \pi N i$$

where:
H is the field strength at the center of the solenoid.
k is a factor determined by the solenoid dimensions.
N is the number of turns per unit length of the solenoid.
i is the current flow in the solenoid.

A curve showing actual measured values of field strength along the axis of the solenoid is shown in Figure 8. This curve shows clearly that the field strength at the center of the solenoid is nearly constant so that the value computed from Equation 3 is an accurate evaluation of the field to which the sample is subjected despite small deviations of the sample from the central position. The peak current value obtained from meter 110 accordingly measures the peak field strength to which the sample is subjected and hence the H value corresponding to the maximum horizontal travel of the cathode ray beam of oscilloscope 24.

It is the function of calibrating mutual inductors 32 and 34 to calibrate the testing system with respect to the flux density indications represented by vertical deflections of the ray beam of oscilloscope 24. To this end, the secondaries of inductors 32 and 34 are connected in series and their free ends connected to transmission line 114 and voltage divider resistance 116. Switch 124 selectively applies to potentiometer 74 voltage from pickup coil 50 or voltage from any one of the three taps of resistance 116.

Current flowing in the exciting solenoid 26 and the primary windings of mutual inductors 32, 34, 36 and 38, causes voltage in the secondary windings of mutual inductors 32 and 34 in accord with the time rate of current change. With switch 124 in positions 2, 3 or 4, this causes a corresponding voltage to be applied to potentiometer 74 and the control electrode of device 76. After this wave is amplified by device 76 it is integrated in the integrator 84 and applied through device 90 to oscilloscope 24 where it deflects the ray beam in the vertical direction. Since the voltage applied to potentiometer 74 is proportional to the time rate of change of current, and this voltage is integrated in integrator 84, the deflection of the ray beam is proportional to the current.

The B or flux density calibrating system operates through the joint use of calibrating mutual inductors 32 and 34 and the ammeter 110. With a particular current flow in exciting solenoid 26, and switch 124 in position 2, 3 or 4, the ray beam is deflected a measurable distance in the vertical direction while at the same time meter 110 may be read. Since meter 110 gives the peak current value, corresponding to the limits of vertical travel of the ray beam, the beam travel is related to the peak current. As the magnetic permeability of air is unity, this enables direct calculation of the flux density values by use of Equation 3, together with the proportionality constants determined by the construction of the equipment. By varying the peak current during calibration, the ray deflection may be established for as many flux density values as required.

The power supply system shown generally at 80 is of conventional construction and includes transformer 126 having its primary winding connected to terminals 56 and 58 a plurality of secondaries to supply heater and space path voltages for the various electron discharge devices used in the system. The high voltage center tapped secondary 127 is connected to full wave rectifier 128 and the filter system comprising condensers 130 and inductor 132. The secondary terminals x—x of transformer 126 are connected to the filament terminals x—x of electron discharge device 134, so that the cathode-anode space of that device is in series with the current path from inductor 132 to electron discharge devices 76 and 90. The effective space path resistance of device 134 is controlled by electron discharge device 136, battery 138, and resistances 140 and 142, in accord with the voltage across filter condenser 144, this control being in direction to tend to maintain constant the voltage across condenser 144 so as to apply to electron discharge devices 76 and 90 a constant voltage despite variations in the voltage applied to terminals 56 and 58 or the current flow in electron discharge devices 76 and 90. This regulating action is highly desirable because of the very low minimum frequency of operation of the amplifiers utilizing devices 76 and 90, together with the low cut-off frequency of the amplifiers in oscilloscope 24.

It will be apparent to those skilled in the art, that I have provided improved B-H curve tracer having good accuracy and in which calibration is achieved by reference to fundamental electrical and magnetic quantities, namely the permeability of air and the physical dimensions of the equipment, thereby eliminating the use of calibrating samples and the like. Furthermore, the error associated with the air flux surrounding a passage through the various coils is eliminated, so as to measure directly the contribution of the sample tested to the total flux. Moreover, solenoid 26 is positioned where there are no immediately adjacent parts so that the consequent good heat conduction permits high values of current flow therein and correspondingly high magnetic field intensities without overheating. In addition, my improved B-H curve tracer may be operated at a relatively low exciting frequency, such as 60 cycles per second, so that the power required to energize solenoid 26 is readily available and errors due to stray fields are minimized.

While I have shown a particular embodiment of my invention, it will, of course, be understood that I do not wish to be limited thereto, since many modifications both to circuit arrangements and in the structures disclosed may be made without departing from the spirit and scope thereof. I, of course, contemplate by the appending claims to cover any such modifications as fall within the true spirit and scope of my invention.

I claim as my invention:

1. A device for determining the magnetic characteristics of a sample including the combination of an exciting solenoid disposed near said sample, means to cause current flow having an alternating component in said solenoid so as to subject said sample to a magnetic field, a pickup coil disposed within the field of said solenoid to produce a voltage determined by the time rate of change of the magnetic flux within said solenoid, and elements to compensate for the magnetic flux passing through said solenoid in the absence of said sample, said elements including a mutual inductor having a first coil and a second coil, means connecting said first coil to carry current proportional to the current in said exciting solenoid and said second coil to said pickup coil so that the voltage therein is in opposition to the voltage of said pickup coil, said mutual inductor being so proportioned relative to said pickup coil that the electromotive force in said pickup coil in the absence of a sample tends to be balanced out, a coil disposed in inductive relation with said pickup coil or said mutual inductor, and means to short circuit said last coil through a resistance of value to equalize the in-phase components of voltage induced in said pickup coil and said second coil, whereby the total voltage across said pickup coil and said second coil is determined solely by the time variations of magnetic flux in said sample.

2. A device for determining the magnetic characteristics of a sample including in combination an exciting solenoid disposed near said sample, means to cause an alternating component of current flow in said solenoid so as to produce an alternating magnetic field about said sample, a pickup coil inductively coupled with said solenoid to produce a voltage determined by the time rate of change of the magnetic field within said solenoid, and elements to compensate for magnetic flux passing through said solenoid in the absence of the said sample, said elements including a mutual inductor having a pair of mutually coupled coils, means to cause a current flow in one of said coils proportional to current flow in said exciting solenoid, and means connecting the other of said coils in series opposition to said pickup coil, said mutual inductors being disposed so that the electromotive force induced in said other coil is independent of the magnetic field about said solenoid, and a compensating coil in mutual inductive relationship with said pickup solenoid or said mutual inductor and short circuited through a resistance, said last coil being short circuited through a resistive impedance of value to cause the in-phase component of voltage in said pickup coil to equal the in-phase component of voltage in said compensating coil, whereby the voltage induced in said pickup coil in the absence of said sample may be compensated by adjusting the value of said resistance and the mutual inductance of said mutual inductors.

3. A device to determine the magnetic properties of a sample including in combination, a solenoid disposed in proximity to said sample, a pickup coil disposed near said solenoid, means to cause an alternating component of current flow in said solenoid, a first mutual inductor having a pair of coaxially mounted coils, a second mutual inductor having a pair of coaxially mounted coils, the coils of said first inductor being substantially identical with the coils of said second inductor, means to cause current flow proportional to the current flow in said solenoid in one coil of each of said inductors, means to support said inductors on a common plane perpendicular to the axis of said solenoid with their axes parallel to the axis of said solenoid and spaced at common radial distance therefrom, means connecting the other coils of said mutual inductors so that the total voltage thereacross is independent of the magnetic field in said solenoid, said mutual inductors being so proportioned and spaced relative to each other that the total voltage induced in said other coils is equal to the voltage induced in said pickup coil in the absence of said sample, and means interconnecting said pickup coil and said other coils so as to produce a voltage dependent only on the time variation of magnetic flux in said sample.

4. A device to determine the magnetic properties of a sample comprising an exciting solenoid, means to support a sample in said solenoid, a pickup coil mounted in inductive relation with said solenoid, a plurality of mutual inductors each comprising a pair of coaxially mounted coils, means to support said inductors in a plane perpendicular to the axis of said solenoid with their axes parallel to the axis of said solenoid and spaced therefrom at a common radial distance, said mutual inductors being in pairs and wound in opposite direction so that the net electromotive force induced in any pair is independent of the field about said exciting solenoid.

5. A device to measure the magnetic characteristics of a sample including a solenoid disposed near said sample, means to cause an alternating component of current flow in said solenoid so as to subject said sample to an alternating magnetic field, a pickup coil disposed in inductive relation with said solenoid so that a voltage proportional to the time rate of change of the magnetic flux in said solenoid is induced therein, a mutual inductor having a first coil and a second coil, means to cause current flow in said first coil proportional to the current flow in said solenoid, means connecting said second coil to said pickup coil so that the voltage induced in said second coil is in opposition to the voltage in said pickup coil, said second coil being proportioned so that the total voltage of said pickup coil and said second coil is zero in the absence of said sample, means to integrate said total voltage, a cathode ray device having a viewing screen and a ray beam, means to deflect said beam in one direction in accord with the output voltage of said last means, means to deflect said beam in direction transverse to said one direction in accord with the current flow in said solenoid, means selectively operable to deflect said ray beam in said one direction in accord with the current flow in said solenoid, and a calibrating device to measure the peak value of current flow in said solenoid, so as to enable determination of both the magnetic field intensity and the flux density corresponding to the deflections of said ray.

6. A device for determining the magnetic characteristics of a sample including the combination of an exciting solenoid disposed near said sample, means to cause current flow having an alternating component in said solenoid so as to subject said sample to a varying magnetic field, a pickup coil disposed completely within said exciting solenoid to produce a voltage determined by the time rate of change of the magnetic flux within said solenoid, and elements to compensate for the magnetic flux passing through said solenoid in the absence of said sample, said elements including a mutual inductor having a first coil and a second coil, said first coil being energized in series with the means causing current flow in said solenoid, means connecting said second coil to said pickup coil so that the voltage induced in said second coil is in opposition to the voltage in said pickup coil, said mutual inductor being located completely outside of said exciting solenoid, and being so proportioned relative to said pickup coil that the electromotive force in said pickup coil in the absence of a sample is balanced out, whereby the voltage produced across the series combination of said second coil and said pickup coil is determined solely by the time rate of change of magnetic flux in said sample.

DAVID E. WIEGAND.

REFERENCES CITED

The following references are of record in the file of this patent:

UNITED STATES PATENTS

| Number | Name | Date |
|---|---|---|
| 1,559,085 | Gokhale | Oct. 27, 1925 |
| 1,961,334 | Burton | June 5, 1934 |
| 2,010,189 | Hallowell | Aug. 6, 1935 |
| 2,134,539 | Thal | Oct. 25, 1938 |
| 2,162,009 | Goldsmith | June 13, 1939 |
| 2,214,625 | Peterson | Sept. 10, 1940 |
| 2,283,742 | Leonard | May 19, 1942 |
| 2,337,352 | Sitterson et al. | Dec. 21, 1943 |
| 2,360,857 | Eldredge | Oct. 24, 1944 |
| 2,367,116 | Goldsmith | Jan. 9, 1945 |
| 2,367,614 | Rich | Jan. 16, 1945 |
| 2,437,455 | Berman | Mar. 9, 1948 |
| 2,438,197 | Wheeler | Mar. 23, 1948 |

OTHER REFERENCES

Electrical Engineering, March 1946, vol. 65, pages 146–149, A B-H Curve Tracer for Magnetic Recording Wire, by Long.